No. 667,924. Patented Feb. 12, 1901.
H. P. SCHOFIELD & L. L. FILSTRUP.
SAW SHARPENING MACHINE.
(Application filed Oct. 22, 1900.)
(No Model.) 9 Sheets—Sheet 6.
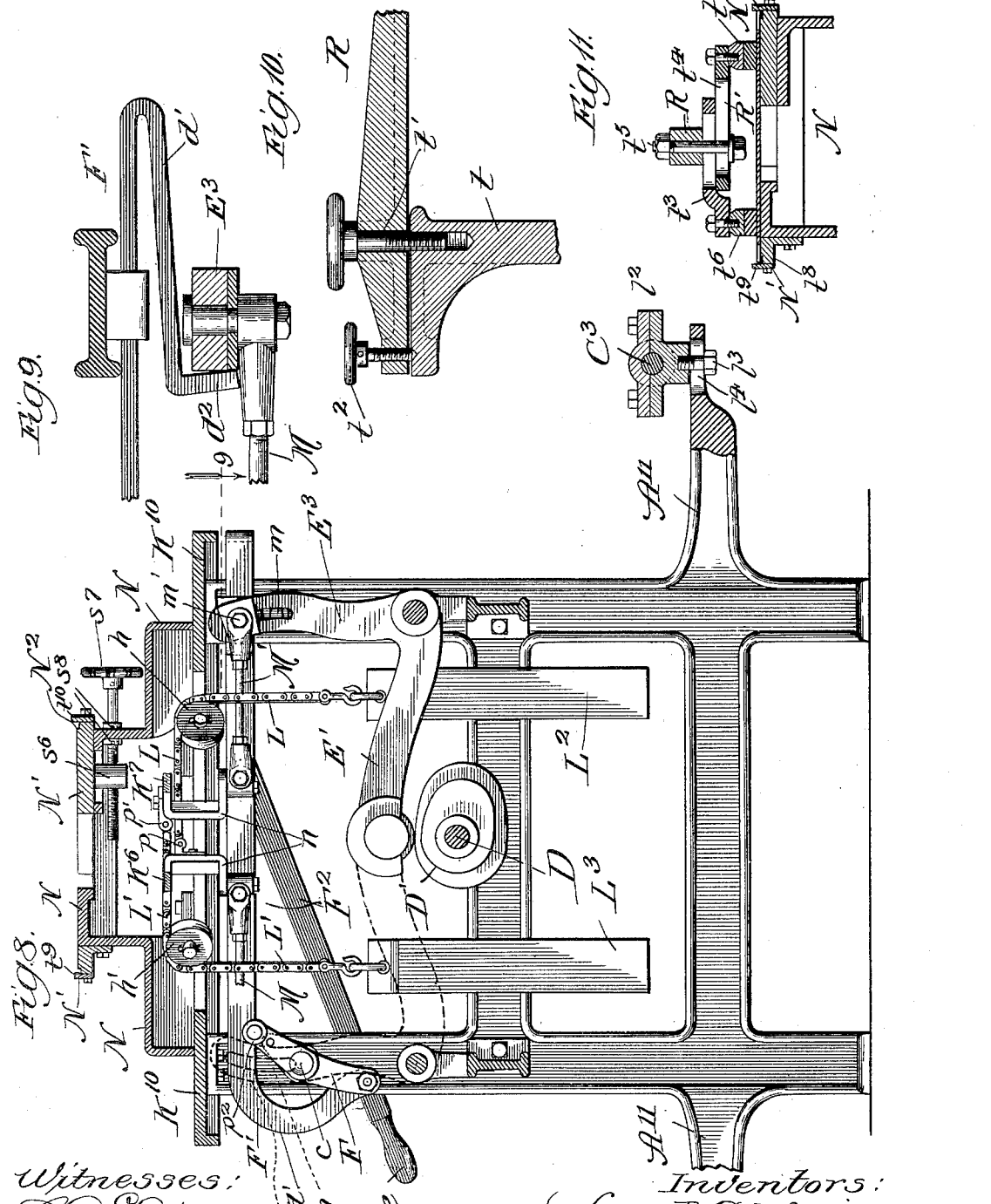
Witnesses:
Inventors:
Henry P. Schofield and
Lars L. Filstrup.
Att'ys.

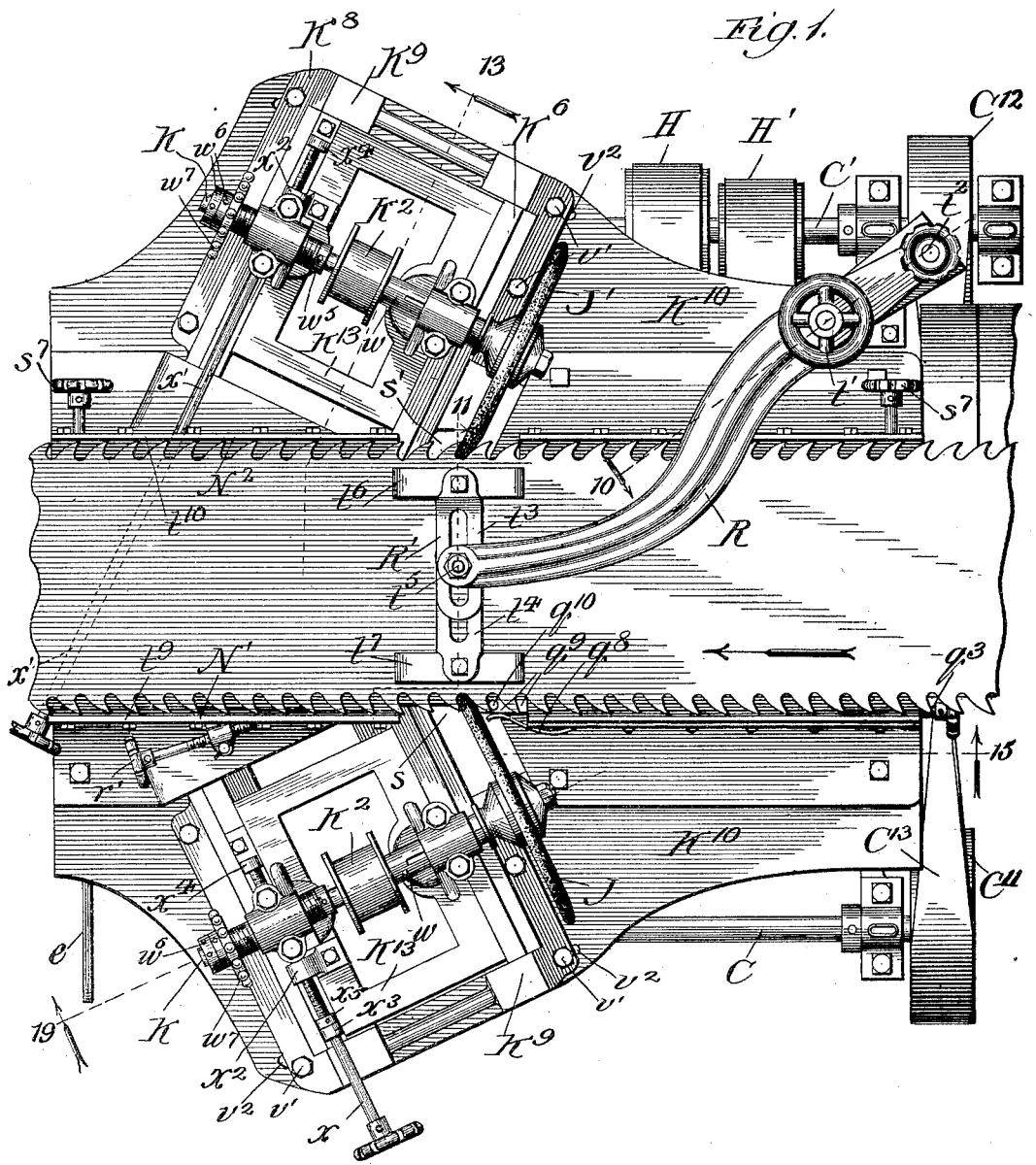

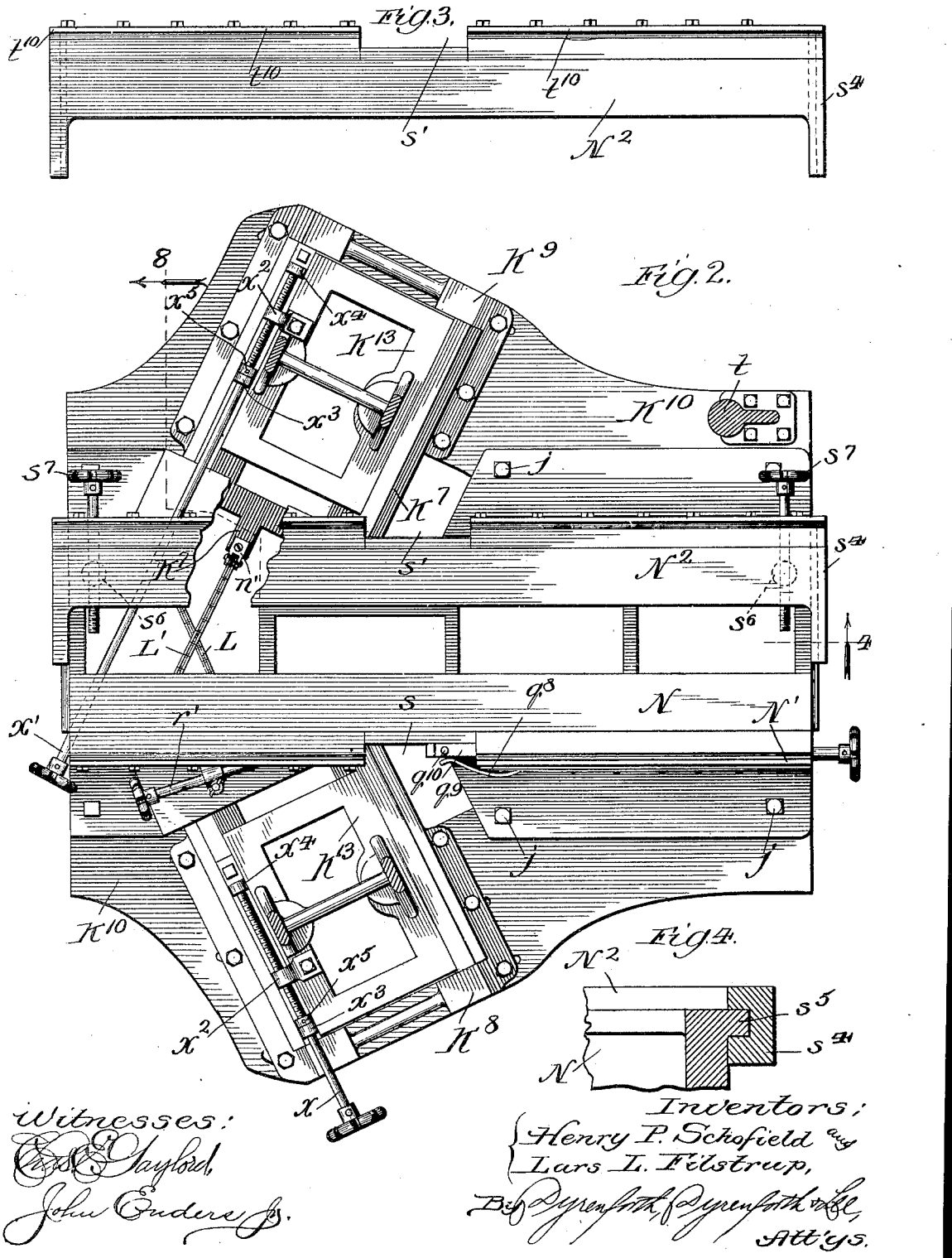

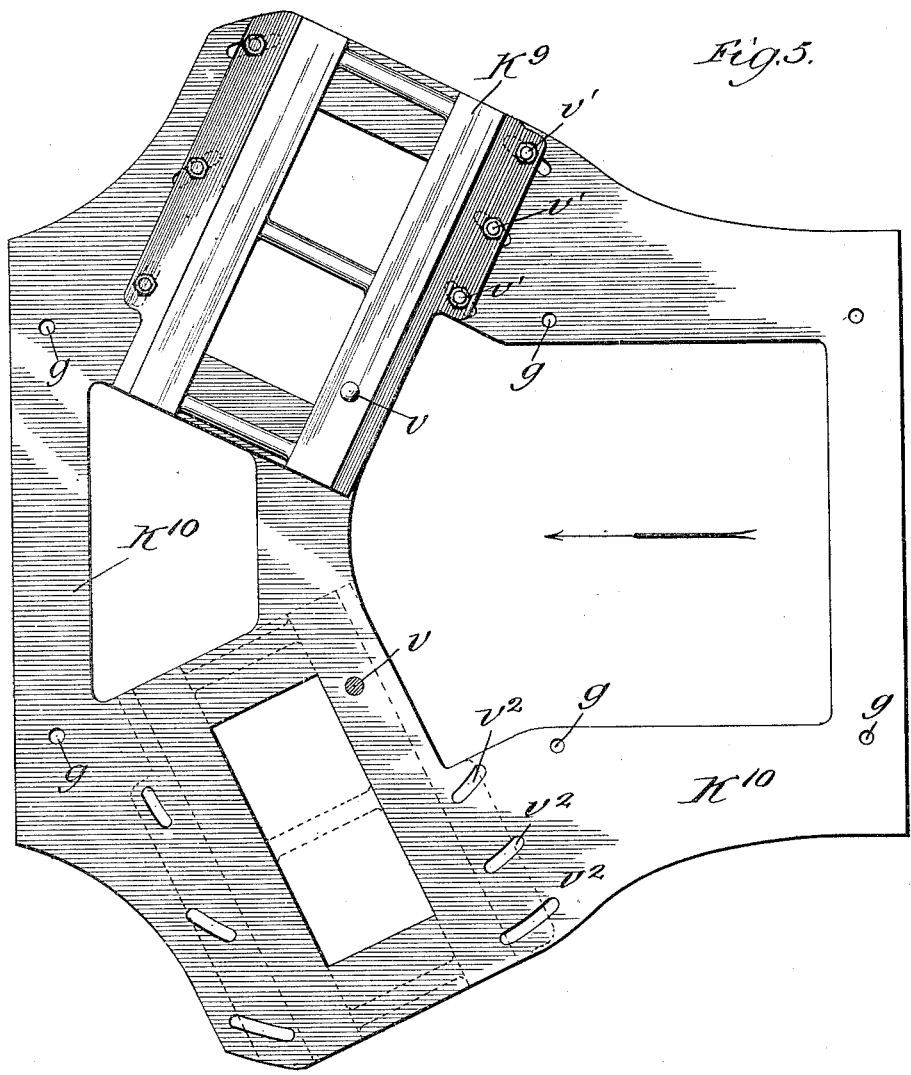

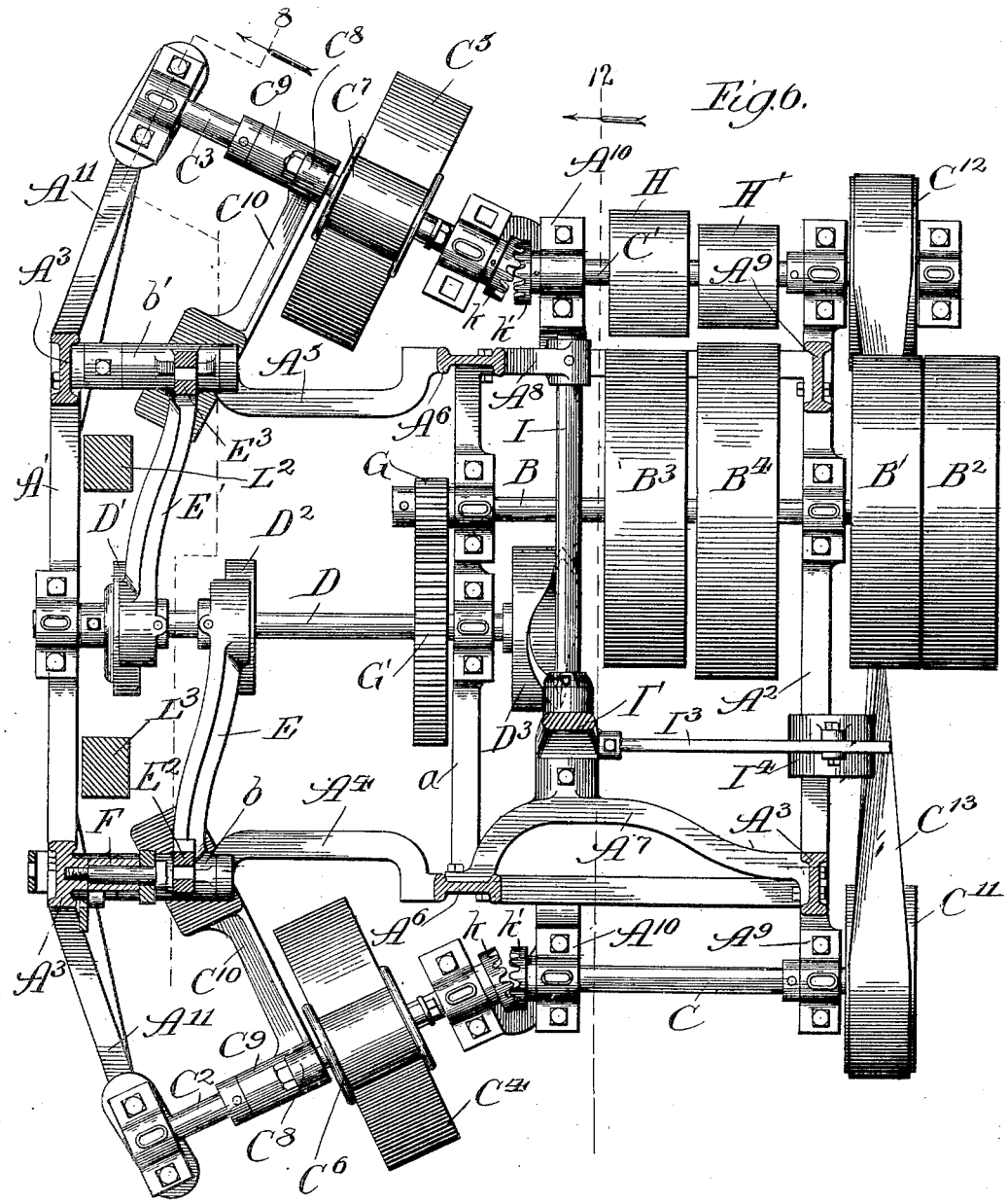

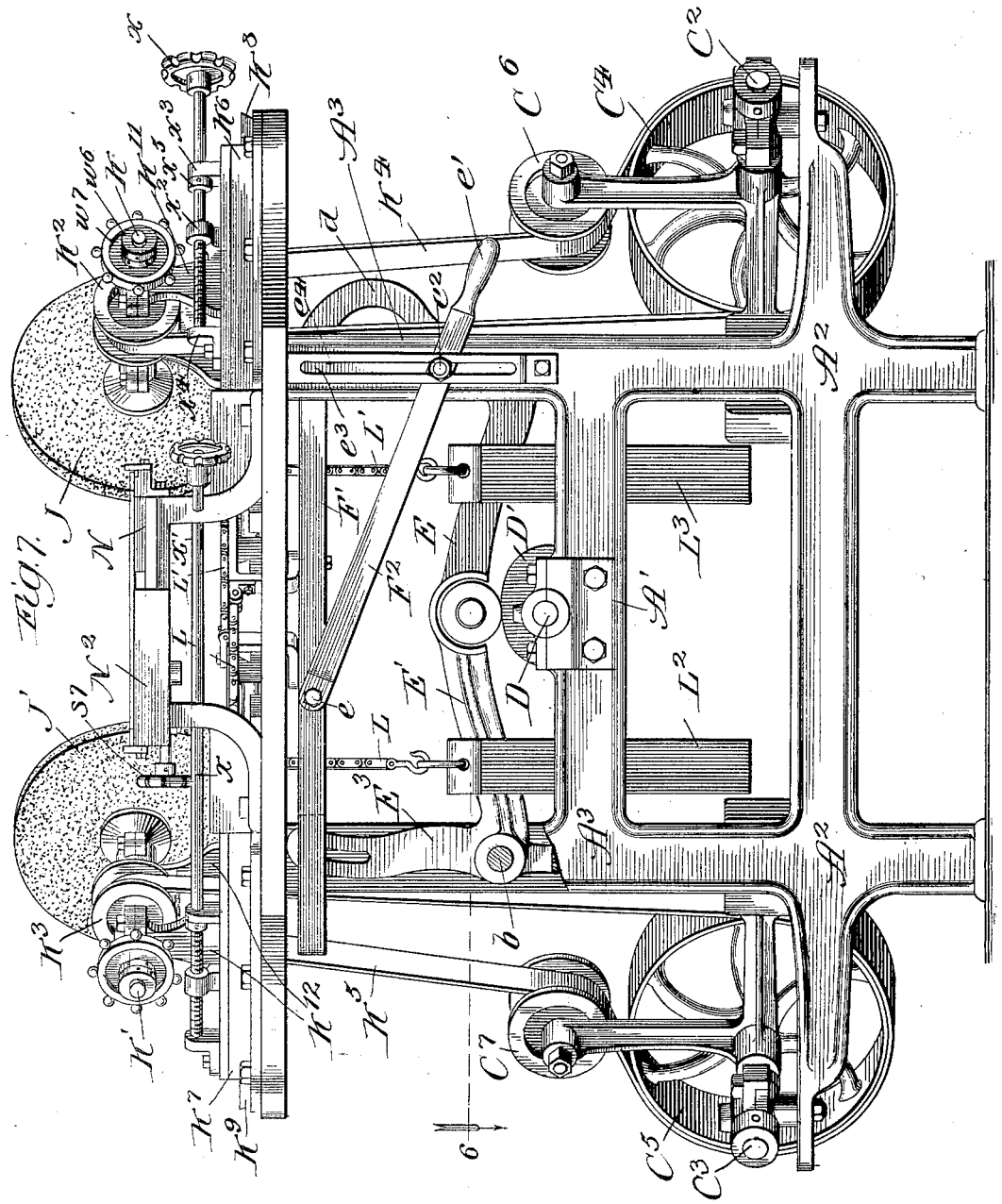

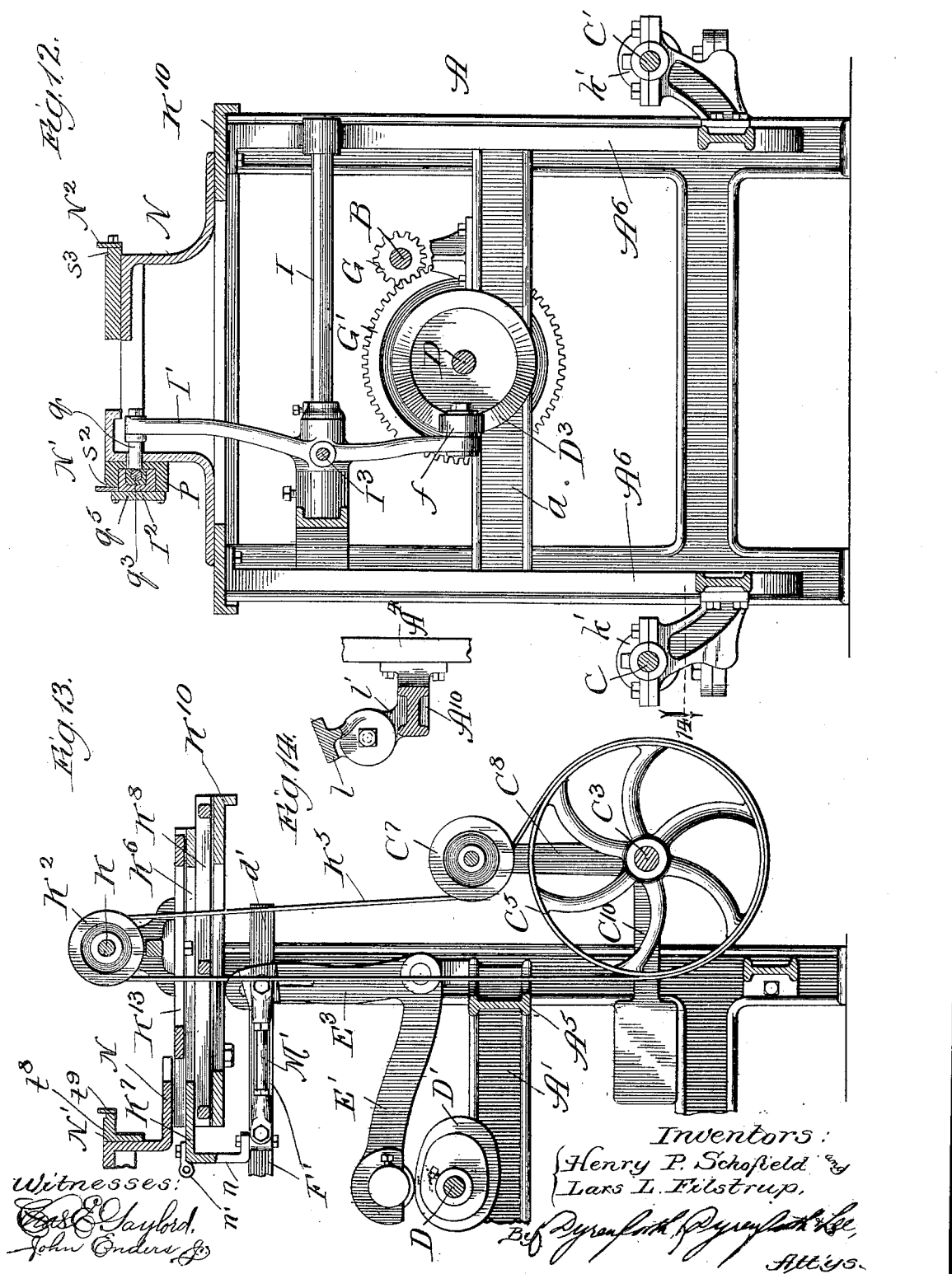

No. 667,924. Patented Feb. 12, 1901.
H. P. SCHOFIELD & L. L. FILSTRUP.
SAW SHARPENING MACHINE.
(Application filed Oct. 22, 1900.)
(No Model.) 9 Sheets—Sheet 8.
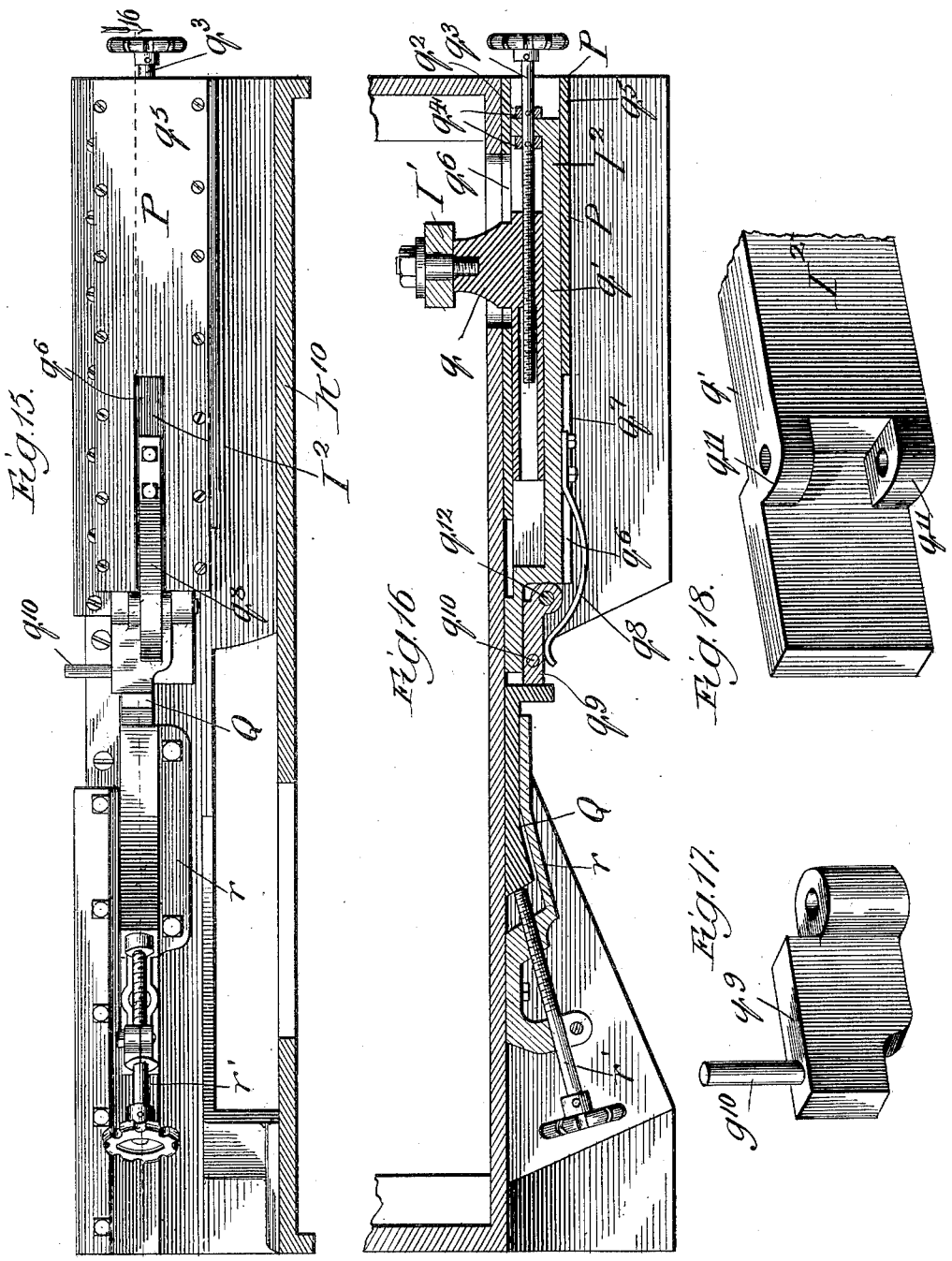

No. 667,924. Patented Feb. 12, 1901.
H. P. SCHOFIELD & L. L. FILSTRUP.
SAW SHARPENING MACHINE.
(Application filed Oct. 22, 1900.)

(No Model.) 9 Sheets—Sheet 9.

Witnesses:

Inventors:
Henry P. Schofield and
Lars L. Filstrup,

UNITED STATES PATENT OFFICE.

HENRY P. SCHOFIELD AND LARS L. FILSTRUP, OF CHICAGO, ILLINOIS.

SAW-SHARPENING MACHINE.

SPECIFICATION forming part of Letters Patent No. 667,924, dated February 12, 1901.

Application filed October 22, 1900. Serial No. 33,944. (No model.)

*To all whom it may concern:*

Be it known that we, HENRY P. SCHOFIELD and LARS L. FILSTRUP, citizens of the United States, residing at Chicago, in the county of Cook and State of Illinois, have invented new and useful Improvements in Saw-Sharpening Machines, of which the following is a specification.

Our invention relates particularly to saw-sharpening machines for use in sharpening saws having teeth at both edges.

Our object is to provide a machine which will automatically feed a saw of this description through the machine and simultaneously grind both sets of teeth of the saw.

As we prefer to construct the machine it involves a horizontal way for the saw, a feeding device for intermittently advancing the saw, two grinding-wheels located at opposite sides of the way for the saw, means for rotating said grinding-wheels, and means for simultaneously reciprocating the grinding-wheels in opposite directions to permit the intermittent advancement of the saw.

The machine is illustrated in its preferred construction in the accompanying drawings, in which—

Figure 19:
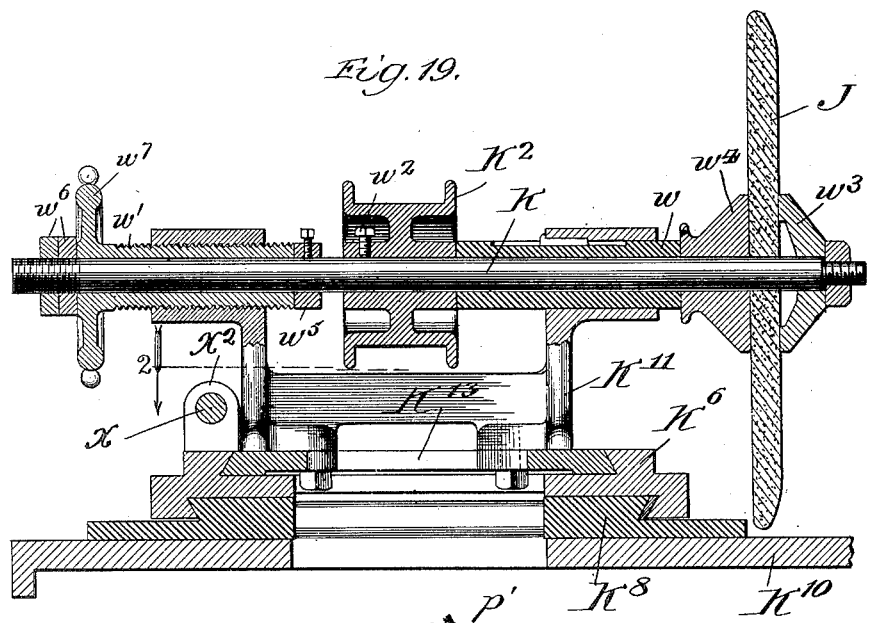
Figure 20:
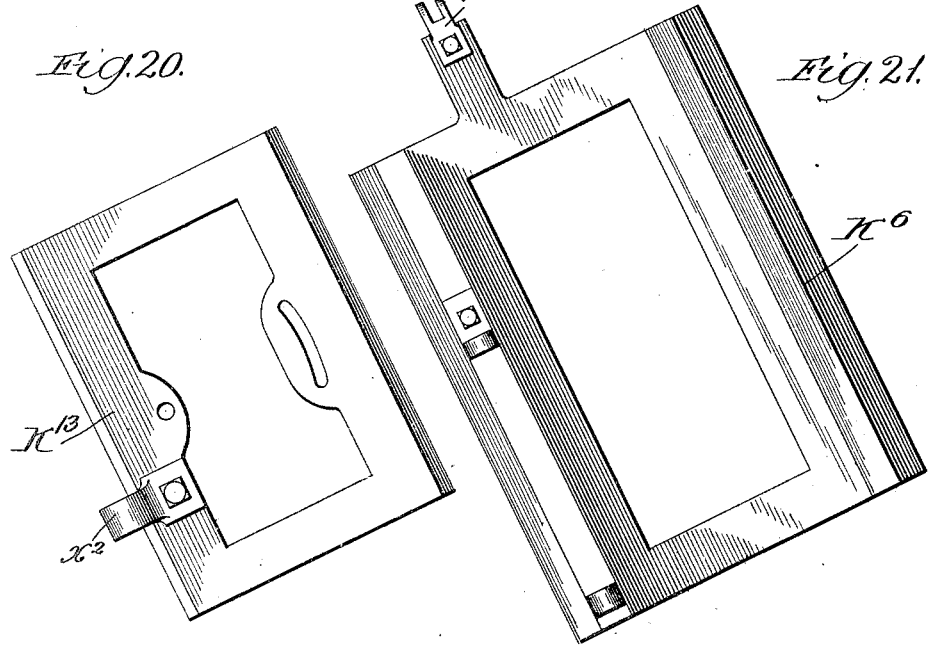
Figure 21:
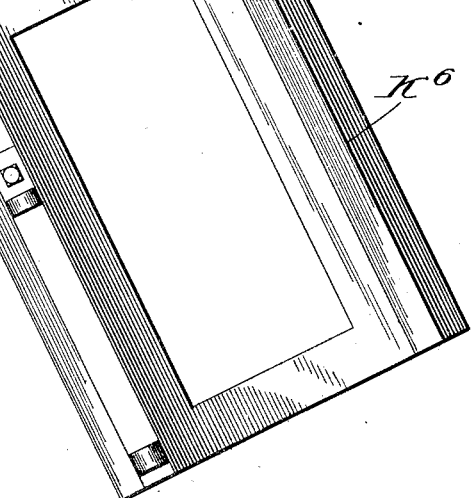

Figure 1 is a plan view of the upper portion of the machine, no attempt being made to show all of the projecting lower parts of the machine; Fig. 2, a plan section taken as indicated at line 2 of Fig. 19, the lower portions of the machine being omitted; Fig. 3, a plan view of an adjustable guide member forming a portion of the way for the saw; Fig. 4, an enlarged broken section taken as indicated at line 4 of Fig. 2; Fig. 5, a plan view of the top plate or table of the machine, one of the adjustable bases for the guides of the grinding-wheel gates or slides being shown in position; Fig. 6, a horizontal section taken at line 6 of Fig. 7; Fig. 7, a view of the machine in rear end elevation; Fig. 8, a transverse vertical section taken as indicated at line 8 of Figs. 2 and 6; Fig. 9, a broken horizontal section taken as indicated at line 9 of Fig. 8; Fig. 10, a broken sectional detail showing the means for adjusting the arm of a guide member which bears upon the upper surface of the saw, the section being taken as indicated at line 10 of Fig. 1; Fig. 11, a section taken as indicated at line 11 of Fig. 1 and showing the saw-contacting portions of the guide member bearing upon the upper surface of the saw to be adjustable; Fig. 12, a transverse vertical section taken as indicated at line 12 of Fig. 6; Fig. 13, a broken transverse vertical section taken as indicated at line 13 of Fig. 1; Fig. 14, a plan section taken as indicated at line 14 of Fig. 12 and illustrating the manner in which one of the bearings of an angularly-disposed shaft is supported; Fig. 15, a longitudinal vertical section taken as indicated at line 15 of Fig. 1; Fig. 16, a section taken as indicated at line 16 of Fig. 15; Fig. 17, a perspective view of a pivoted block and a feed-finger carried thereby; Fig. 18, a perspective view of a reciprocating feed-arm to which said block is pivotally connected; Fig. 19, a section taken as indicated at line 19 of Fig. 1; Fig. 20, a view of a detached plate which serves to support the grinding-wheel standard, and Fig. 21 a view of a detached slide to which said standard-supporting plate is adjustably connected.

A represents a frame comprising end standards $A'$ $A^2$, having corner-uprights $A^3$, side standards $A^4$ $A^5$, having central standards $A^6$, rock-shaft-supporting brackets $A^7$ $A^8$, and duplicate laterally-extending shaft-supporting brackets $A^9$ $A^{10}$ $A^{11}$; B, Fig. 6, the main shaft of the machine, journaled in suitable bearings in the end $A^2$ and a transversely-extending intermediate frame member $a$; $B'$ $B^2$, tight and loose pulleys, respectively, for receiving the belt which communicates motion to the main shaft; $B^3$ $B^4$, pulleys rigidly connected to the shaft B; C C', shafts extending longitudinally of the machine and supported in suitable bearings on the brackets $A^9$ $A^{10}$; $C^2$ $C^3$, shafts extending at angles to the shafts C C' and receiving motion therefrom and supported from the brackets $A^{10}$ $A^{11}$; $C^4$ $C^5$, pulleys rotatable with the shafts $C^2 C^3$, respectively; $C^6 C^7$, yieldingly-held pulleys journaled upon studs projecting from the extremities of one set of arms $C^8$ of bell-crank levers $C^9$, journaled on the shafts $C^2$ $C^3$, respectively, and provided with inwardly-extending weight-arms $C^{10}$; $C^{11}$ $C^{12}$, pulleys connected with the shafts C C', respectively, and joined by a belt $C^{13}$, through which motion is communicated to the shaft C from the shaft C'; D, a cam-shaft journaled in the frame members A′ and a and provided with cams D′, D², and D³; E E′, Fig. 7, bell-crank levers or rock-arms pivoted, respectively, at $b\ b'$ and provided with upwardly-extending arms E² E³, respectively, which serve to actuate the grinding-wheel slides; F, Figs. 6 and 8, a rock-arm which is pivotally supported from the frame on a stud $c$ and is manually operated when it is desired to hold the grinding-wheels away from the saw; F′, Figs. 7 and 8, a transversely-extending sliding link supported in suitable guides on the frame and provided with a downcurved end $d$, pivotally connected with the lower end of the rock-lever F, and a recurved end $d'$, Fig. 9, having an offset portion $d^2$, which may be moved into engagement with the adjacent vertical arm E³ of the bell-crank lever E′; F², a link pivotally connected with the link F′ at a point $e$ and provided at its free end with a handle $e'$ and adjacent thereto with a stud $e^2$, which moves in a vertical slot $e^3$ in a part $e^4$, connected with one of the vertical uprights A³; G G′, Fig. 6, a pinion and gear, respectively, for communicating motion from the shaft B to the shaft D; H H′, pulleys on the shaft C′ and connected, respectively, with the pulleys B³ B⁴, according to the speed required by means of a belt, (not shown;) I, a transversely-extending rock-shaft journaled in suitable bearings with which the frame is provided; I′, a rock-lever provided at its lower end with a roller $f$, which bears upon the surface of the cam D³ and pivotally connected at its upper end, Fig. 12, with a feed-finger-actuating slide I²; I³, a weight-arm equipped with an adjustable weight I⁴ and serving to hold the roller $f$ in engagement with the cam D³; J J′, Fig. 7, grinding-wheels located on opposite sides of a guide or way serving to receive a saw; K K′, horizontally-disposed grinding-wheel arbors convergent toward the front or feed end of the machine; K² K³, pulleys on said arbors; K⁴ K⁵, belts connecting said arbor-pulleys, respectively, with the pulleys C⁴ C⁶ and C⁵ C⁷; K⁶ K⁷, reciprocating grinding-wheel slides connected with guides K⁸ K⁹, respectively, said guides being adjustably connected with a top plate or table K¹⁰, said top plate being connected at points $g$, Fig. 5, with the upper ends of the uprights of the frame; K¹¹ K¹², arbor-standards adjustably connected with plates K¹³, Figs. 19, 20, and 21, which are adjustable on the slides K⁶ K⁷, respectively; L L′, chains connected, respectively, with the slides K⁶ K⁷, Fig. 8; L² L³, weights supported, respectively, from the free ends of the chains L L′, said chains passing over rollers $h\ h'$; M M′, rods connecting the upper ends of the arms E² E³ with the inner ends of the slides K⁶ K⁷, respectively; N, a guide or way for the saw, which is connected with the frame-top by bolts $j$, Fig. 2, and provided with one fixed guide-flange N′ and one adjustable guide-flange N²; P, a guide with which the part N is equipped and which serves to receive the reciprocating feed-slide I²; Q, Figs. 15 and 16, an adjustable stop for the block which carries the feed-finger, and R an arm secured to the frame and provided at its free end with a guide member R′, which bears upon the upper surface of the saw.

As indicated, motion is imparted to the main shaft at the fixed pulley B′, and from the main shaft motion is communicated to the shaft D through the gears G G′ and to the shaft C′ through either of the set of pulleys B³ H or the set of pulleys B⁴ H′, according to the speed desired. From the shaft C′ motion is communicated to the shaft C through the belt C¹³. Pinions $k\ k'$ connect one end of the shaft C with the adjacent end of the diagonally-extending shaft C². A like set of pinions connect the shaft C′ with the shaft C³. As shown in Figs. 12 and 14, the bearing-supporting arm $l$ of that end of the shaft C² which is adjacent to the bracket A¹⁰ is pivotally connected with the lug $l'$ on said bracket A¹⁰, thereby permitting the angle of the shaft C² to be changed. A similar adjustable bearing is provided for a like location at the shaft C³. The opposite ends of the shafts C² C³ are journaled in bearings $l^2$, Fig. 8, having adjustable connection with the brackets A¹¹ by means of bolts $l^3$ and slots $l^4$. By this means the pulleys on the shafts C² C³ may be brought accurately into the plane of the pulleys of the grinding-wheel arbors, which latter are necessarily set at an angle to the frame.

As seen from Fig. 8, the upper ends of the arms E² and E³ of the bell-crank levers E and E′ are adjustably connected, by means of slots $m$ and bolts $m'$, with the rods M M′. By means of this connection the traverse of the grinding-wheel slides is regulated. It will be noted that the weight L³ acts through the chain L′ to draw the slide K⁷ inwardly, thereby drawing the upper end of the arm E³ inwardly and holding the cam end of the bell-crank lever E′ in contact with the cam D′. It will be noted also that the weight L² acts through the chain L to draw the slide K⁶ inwardly, thereby causing the cam end of the bell-crank lever E to be held in contact with the cam D². The means of connection between the grinding-wheel slides and the links M M′ are downwardly-turned inwardly-projecting extensions $n$, with which the inner ends of the links M M′ have pivotal connection. The chains L L′ are shown connected with their respective slides by detachable lugs $p\ p'$, respectively.

The manually-operated rock-arm F is provided with a projection $p^2$, in the path of which is located the arm E³ of the bell-crank lever E. From a view of Fig. 7 it will be observed that when the link F² is raised by means of the handle $e'$ the link F′ will be moved bodily, and by means of the downcurved end $d$ of the link F′ the upper end of the rock-lever F will be moved in a direction opposite that of the direction of thrust on the link F′. Thus the projection $p^2$ will be caused to engage the arm E³, while the offset $d^2$ of the opposite end of the link F' will be caused to engage the arm $E^3$, whereby the bell-crank levers E E' may be thrown out of engagement with their cams and the reciprocating action of the grinding-wheels stopped. For convenience the stud $e^2$ is a bolt, so that the link $F^2$ may be secured in its elevated position until it is desired to set the grinding-wheel slides in motion again.

The slide $I^2$ (shown in Figs. 15 and 16) comprises a head $q$, which is pivotally connected to the upper end of the rock-lever I', and a slide $q'$, adjustably connected to said head by means of a perforated lug $q^2$, through which passes the shank of an adjusting-screw $q^3$, confined against longitudinal movement with relation to the part $q'$ by collars $q^4$, said screw having threaded connection with the head $q$. The guide P, which receives the slide $q'$, is firmly fixed to the part N and is provided with a removable side plate $q^5$. A slot $q^6$ is provided for the head $q$ to work in, and a slot $q^7$ is provided to receive a spring $q^8$, attached to the slide $q'$ and serving normally to hold a pivoted block $q^9$, from which projects the feed-finger $q^{10}$ in proper position with relation to the slide $q'$. The extremity of the slide $q'$ is offset, and adjacent to said offset are provided perforated lugs $q^{11}$, between which the block $q^9$ is pivoted on a pin $q^{12}$.

As appears from Figs. 1, 2, and 15, the grinding-wheel J engages the saw closely adjacent to the vertically-disposed feed-finger $q^{10}$, and to permit the grinding-wheels to be moved into engagement with the saw the guide members N' and $N^2$ are recessed at points $s$ $s'$. As appears from Fig. 12, the guide members N' $N^2$ are provided with longitudinally-extending recesses $s^2$ and $s^3$ to receive the swaged teeth of the saw. As appears from Figs. 2, 4, and 8, the member $N^2$ is provided with grooved flanges $s^4$, which engage suitable guides $s^5$ of the member N. Said member $N^2$ is also provided with downwardly-projecting lugs $s^6$, through which pass adjusting-screws $s^7$. As shown in Fig. 8, the adjusting-screws are held against longitudinal movement by collars $s^8$, so that when the screws are turned the effect will be to move the member $N^2$ inwardly or outwardly, according to the direction of the turning.

In Fig. 10 the arm R is shown connected with a bracket $t$, which extends upwardly from the frame-top, as shown in Fig. 2. A screw $t'$ serves to connect the arm to the bracket, and a set-screw $t^2$ at the short end of the arm R serves as a means for raising the short end and depressing the long end, thereby bringing the member R' into close engagement with the upper surface of the saw. As shown in Figs. 1 and 11, the member R' comprises two transversely-extending slotted pieces $t^3$ $t^4$, connected by a bolt $t^5$, which serves also to join both parts to the arm R, and friction-heads $t^6$ $t^7$, detachably connected to the parts $t^3$ $t^4$, respectively. Preferably the guide member N' is formed with a detachable part $t^8$, to which in turn is connected a detachable steel flange $t^9$. Also the guide member $N^2$ is provided with a detachable steel flange $t^{10}$.

In Fig. 5 the direction of movement of the saw across the frame-top is indicated by the arrow, and it will be observed that the guides for the grinding-wheel gates are disposed upon said frame-top so as to be convergent toward the rear or delivery end of the machine. Each of said guides is connected to the frame-top by a pivotal stud or bolt $v$, and additional bolts $v'$ are passed through curved slots $v^2$ in the frame-top, said slots being struck on radii from the points $v$. It will thus appear that the angle of convergence may readily be changed to bring the grinding-wheels into proper position to give the desired slope to the teeth edges.

Each arbor-wheel is adjustable transversely of its slide, according to the construction shown in Fig. 19. There the shaft K is shown extending through adjustable bushings $w$ $w'$. The bushing $w$ is keyed to its box, so as to permit a longitudinal movement therein. Pulley $K^2$ is secured to the arbor by means of a set-screw $w^2$ and affords a shoulder-bearing against one end of the bushing $w$. The grinding-wheel J is secured between washers $w^3$ $w^4$, the latter of which affords a shoulder which is in contact with the outer end of the bushing $w$. The bushing $w'$ has threaded connection with its box and is itself confined against longitudinal movement relative to the arbor by means of an adjustable ring $w^5$ and lock-nuts $w^6$. It thus appears that by turning the bushing $w'$ within its box, as by means of a hand-wheel $w^7$, the arbor and parts carried by it are moved transversely of the slide. The boxes which receive the bushings $w$ $w'$ are preferably sectionally constructed, as shown in Fig. 7, and by means of the screw connection between the parts of the box which receive the bushing $w'$ the latter may be firmly clamped in any desired position.

The preferred method of adjusting the plates $K^{13}$ on the slides with which they are respectively connected is clearly shown in Fig. 2. The adjustment is secured by means of screws $x$ $x'$, which are provided with operating-knobs located on the same side of the machine. Each plate $K^{13}$ is provided with a lug $x^2$, having threaded connection with the adjacent adjusting-screw. The adjusting-screws pass through lugs $x^3$ on the slides and extend into depressions in lugs $x^4$ on the slides. Collars $x^5$ are provided to receive longitudinal thrust upon the screws. It thus appears that the operator can adjust each arbor-standard upon its slide so as to give the desired depth of cut without moving from one side of the machine to the other.

In operation rotary motion is imparted to the grinding-wheels from the inclined shafts $C^2$ and $C^3$, reciprocating motion is imparted to the grinding-wheel slides through the medium of the bell-crank levers E and E', and intermittent motion is imparted to the saw through the medium of the cam D³, the rock-lever I', and the feed-slide I². In the movement of the saw through the machine the guide-head R' bears upon the upper surface of the saw and holds the saw firmly in position during the grinding operation. In saws of the character described the teeth of the two edges are arranged opposite to each other, and in the machine shown the grinding-wheels are arranged accurately opposite to each other and adapted to engage the saw adjacent to the blocks t⁶ t⁷ of the guide-head R'. The arm R is preferably supported near the front end of the frame and on the side of the frame opposite the one where are located the feed slide and stop. The rock-lever I' is caused to move in a vertical longitudinal plane by means of the cam D³, as is evident from Fig. 12. At each revolution of the cam-shaft D the grinding-wheel slides are moved outwardly against the action of their weights and then moved inwardly again by said weights.

Changes in the details of construction within the spirit of our invention may be made. Hence no limitation is intended by the detailed description given above except as shall appear from the appended claims.

The shaft C and the diagonally-extending shaft C² may be regarded as a two-part shaft, the diagonally-extending portion being adjustable to bring it into parallelism with the corresponding arbor. Any suitable means may be provided at the adjacent ends of the shafts C and C² for communicating motion from the former to the latter. What has been said of these shafts applies also to the shafts C' and C³.

What we claim as new, and desire to secure by Letters Patent, is—

1. In a saw-sharpening machine, the combination of a frame provided with a way for a saw, guides located at opposite sides of said way, grinding-wheel slides movable on said guides, grinding-wheels carried by said slides, means for moving said slides, means for imparting rotary motion to the grinding-wheels, and means for intermittently advancing a saw, substantially as and for the purpose set forth.

2. In a saw-sharpening machine, the combination of a frame provided with a way for a saw, guides located at opposite sides of said way and convergent toward the rear end of the machine, grinding-wheels slidingly mounted on said guides, means for imparting rotary motion to the grinding-wheels, and means for intermittently advancing a saw, substantially as and for the purpose set forth.

3. In a saw-sharpening machine, the combination of a frame provided with a way for a saw, guides on said frame convergent toward the rear end of the machine, slides on said guides, grinding-wheels carried thereby, a cam-shaft provided with two cams, means actuated by said cams for simultaneously moving said slides in opposite directions, means for imparting rotary movement to the grinding-wheels, and means for intermittently advancing a saw, substantially as and for the purpose set forth.

4. In a saw-sharpening machine, the combination of a frame, provided with a way for a saw, guides on said frame disposed at an angle to said way, slides on said guides, grinding-wheels carried by said slides, a cam-shaft provided with two cams for actuating the grinding-wheel slides and with a cam for actuating the feed mechanism, means contacting with said two first-named cams and connecting with the grinding-wheel slides and serving to simultaneously move said slides in opposite directions, and a saw-advancing mechanism extending into contact with the third cam on said cam-shaft, substantially as and for the purpose set forth.

5. In a saw-sharpening machine, the combination of a frame provided with a way for a saw, convergent guides adjustably connected with said frame on opposite sides of said way, grinding-wheel slides connected with said guides, means for simultaneously reciprocating said slides in opposite directions, grinding-wheels carried by the slides, means for imparting rotary motion to the grinding-wheels, and means for intermittently advancing a saw, substantially as and for the purpose set forth.

6. In a saw-sharpening machine, the combination of a frame provided with a way for supporting a saw on one of its sides, convergent guides extending at an angle to said way, slides on said guides, grinding-wheels carried by said slides, weights attached to said slides and tending to hold the same toward the inner ends of their traverses, a cam-shaft provided with cams, rock-levers movable by said cams and connected with said slides and serving to move the slides outwardly against the action of said weights, means for imparting rotary motion to the grinding-wheels, and means for intermittently advancing a saw, substantially as and for the purpose set forth.

7. In a saw-sharpening machine, the combination of a frame, an arbor-standard having two upright members provided with heads for receiving journal-boxes, journal-boxes movably connected with said heads, an arbor journaled in said journal-boxes and confined longitudinally thereof, means for adjusting the journal-boxes and through the medium thereof the arbor, and a grinding-wheel fixed to and adjustable with said arbor, substantially as described.

8. In a saw-sharpening machine, the combination of a frame provided with a horizontally-disposed way for a saw, having an adjustable guide member, grinding-wheels rotatingly and reciprocatingly mounted on opposite sides of said way, and means for intermittently advancing a saw through said way, substantially as and for the purpose set forth.

9. In a saw-sharpening machine, the combination of a frame provided with a horizontal way having an adjustable guide member, horizontally-disposed guides located at opposite sides of and beneath said way, grinding-wheel standards reciprocatingly mounted on said guides, grinding-wheels journaled in said standards, means for imparting motion to the grinding-wheels, and means for intermittently advancing a saw, substantially as and for the purpose set forth.

10. In a saw-sharpening machine, the combination of a frame provided with a substantially horizontally disposed way for a saw, horizontally-disposed, rearwardly-convergent guides on said frame, slides connected with said guides, arbor-standards supporting plates movable on said slides, adjusting-screws for said plates provided with operating-handles extending to the same side of the machine, grinding-wheels supported from the said plates, means for imparting motion to the grinding-wheels, and means for intermittently advancing a saw, substantially as and for the purpose set forth.

11. In a saw-sharpening machine, the combination of a frame, provided with a horizontal way for a saw, an arm R, adjustably connected with said frame and provided with a guide-head adapted to engage the upper surface of the saw, grinding-wheels reciprocatingly and rotatingly mounted at opposite sides of said way, and means for intermittently advancing a saw, substantially as and for the purpose set forth.

12. In a saw-sharpening machine, the combination of a frame provided with a horizontal way, a guide member for the upper surface of the saw having a head adjustable to the width of the saw, grinding-wheels reciprocatingly and rotatingly mounted at opposite sides of said way, and mechanism for intermittently advancing a saw, substantially as and for the purpose set forth.

13. In a saw-sharpening machine, the combination of a frame provided with a horizontal way for a saw, rearwardly-convergent guides located at opposite sides of said way, slides on said guides, grinding-wheels carried by said slides, weights connected with the slides and tending to move them toward the inner ends of their traverses, cams for moving said slides upwardly, means for manually retracting said slides to withdraw the grinding-wheels entirely from contact with the saw, and means for intermittently advancing a saw, substantially as and for the purpose set forth.

14. In a saw-sharpening machine, the combination of a frame having a horizontal way for a saw, guides at opposite sides of said way, slides on said guides, grinding-wheels carried by said slides, weights connected with said slides and tending to draw the same inwardly, means automatically actuating said slides against the action of said weights, means for automatically advancing a saw, and manually-operated means for retracting said slides, comprising a slidable link F' provided with means for engaging the mechanism for automatically moving said slides against the action of their weights, and a link F² pivotally connected with the link F' and slidably connected at one point with the frame, whereby when the link F² is moved in one direction the link F' receives an end thrust, substantially as and for the purpose set forth.

15. In a saw-sharpening machine, the combination of a frame provided with a horizontal way for a saw, grinding-wheel slides connected with the frame on opposite sides of said way, weights connected with said slides and tending to draw the same inwardly, rock-levers E and E' connected with said slides, a cam-shaft provided with cams actuating said rock-levers, a horizontally-disposed link F', provided at one end with an offset for engaging the rock-lever E', a rock-lever F pivotally connected with the opposite end of link F', and also pivotally connected with the frame, means on the lever F for engaging the rock-lever E, a link F² having sliding connection with the frame at one point and serving to impart movement to the link F', and means for intermittently advancing a saw, substantially as and for the purpose set forth.

16. In a saw-sharpening machine, the combination of a frame, a saw-guide, a reciprocating slide, a grinding-wheel carried by said slide, means for imparting motion to the grinding-wheel, and feed mechanism comprising a rock-lever I', means for actuating said rock-lever, a head $q$ pivotally connected with the lever I', a slide $q'$ adjustably connected with the head $q$, a block $q^9$ pivotally connected with the slide $q'$, and a spring $q^8$ for holding the block $q^9$ in correct position with relation to the slide $q'$, substantially as and for the purpose set forth.

17. In a saw-sharpening machine, the combination of a frame provided with a way for a saw, two rearwardly-convergent guides located on opposite sides of the said way, slides connected with said guides, grinding-wheels carried by said slides and supported by arbors equipped with pulleys, diagonally-extending shafts provided with pulleys, belt connection between the pulleys of the said inclined shafts and the arbor-pulleys, shafts extending parallel with the frame and serving to impart motion to the said diagonally-extending shafts, means for imparting motion to the shafts parallel with the frame, means for reciprocating the slides, and means for intermittently advancing a saw, substantially as and for the purpose set forth.

18. In a saw-sharpening machine, the combination of a main shaft B, a cam-shaft D geared thereto, parallel longitudinally-extending shafts C and C' located at opposite sides of the machine, means for imparting motion from the shaft B to the shaft C', means for imparting motion from the shaft C' to the shaft C, forwardly-convergent shafts C², C³ receiving motion from the shafts C, C', respectively, rearwardly-convergent guides on the frame, slides on said guides, grinding-wheels carried by said slides, pulleys on the arbors of said grinding-wheels, pulleys on said diagonally-extending shafts lying in the planes of the arbor-wheel pulleys, belt connection between each arbor-wheel pulley and the pulley of the appropriate diagonally-extending shaft, means for reciprocating the slides, and means for intermittently advancing a saw, substantially as and for the purpose set forth.

19. In a saw-sharpening machine, the combination of a frame provided with a way for a saw, a guide extending at an angle to said way, a slide reciprocatingly mounted on said guide, means for intermittently advancing a saw through said way, a grinding-wheel standard supported from said slide, and having two upright members provided with movable journal-boxes, a grinding-wheel arbor journaled in said boxes and movable longitudinally therewith, means for adjusting the journal-boxes, and a grinding-wheel fixed to and movable with said arbor, substantially as and for the purpose set forth.

20. In a saw-sharpening machine, the combination of a frame provided with a way for a saw, a guide extending at an angle to said way, a slide reciprocatingly mounted on said guide, means for intermittently advancing a saw through said way, a grinding-wheel standard supported from said slide, independent bushings adjustably connected with said standard, a grinding-wheel arbor rotatable in said bushings and adjustable therewith, and a grinding-wheel fixed to and movable with said arbor, substantially as and for the purpose set forth.

21. In a saw-sharpening machine, the combination of a frame provided with a way for a saw, a guide extending at an angle to said way, a slide reciprocatingly mounted on said guide, means for intermittently advancing a saw through said way, a grinding-wheel standard supported from said slide, a bushing slidably connected with said standard, a second bushing having threaded connection with said standard, an arbor extending through said bushing and confined longitudinally with relation thereto, a grinding-wheel fixed to and movable with said arbor, and means for securing said bushing in a desired position, substantially as and for the purpose set forth.

22. In a saw-sharpening machine, the combination of a frame provided with a horizontal way for a saw, guides on said frame at opposite sides of said way and beneath the level thereof, slides movable on said guides, weights for holding the guides inwardly, flexible connections between said weights and said guides, pulleys over which said flexible connections pass, a cam-shaft provided with cams, bell-crank levers, each connected at one end with a cam and connected at the other end with a slide, grinding-wheels supported on said slides, means for imparting rotary movement to the grinding-wheels, and means for intermittently advancing a saw through said way, substantially as and for the purpose set forth.

23. In a saw-sharpening machine, the combination of a frame provided with a way for a saw, grinding-wheels reciprocatingly and rotatingly mounted at opposite sides of said way, and means for intermittently advancing a saw, said way being provided with an adjustable guide member $N^2$ and adjusting-screws $s^7$ connected therewith, substantially as and for the purpose set forth.

HENRY P. SCHOFIELD.
LARS L. FILSTRUP.

In presence of—
D. W. LEE,
ALBERT D. BACCI.